United States Patent
Silbermann

(10) Patent No.: US 8,502,119 B2
(45) Date of Patent: Aug. 6, 2013

(54) TRAVEL DRIVE

(75) Inventor: Kai Silbermann, Langenhagen (DE)

(73) Assignee: Buehler AG, Uzwil (CH)

( * ) Notice: Subject to any disclaimer, the term of this patent is extended or adjusted under 35 U.S.C. 154(b) by 1749 days.

(21) Appl. No.: 11/571,640

(22) PCT Filed: Jul. 4, 2005

(86) PCT No.: PCT/CH2005/000374
§ 371 (c)(1),
(2), (4) Date: Jun. 4, 2007

(87) PCT Pub. No.: WO2006/002568
PCT Pub. Date: Jan. 12, 2006

(65) Prior Publication Data
US 2007/0289401 A1    Dec. 20, 2007

(30) Foreign Application Priority Data
Jul. 5, 2004 (DE) .................... 10 2004 032 442

(51) Int. Cl.
*H05B 1/02* (2006.01)
*F16D 3/00* (2006.01)

(52) U.S. Cl.
USPC ......................................... 219/494; 74/433.5

(58) Field of Classification Search
CPC ....................................................... H05B 1/02
USPC ............. 219/121.43; 74/433, 415, 422, 457, 74/465; 475/168
See application file for complete search history.

(56) References Cited

U.S. PATENT DOCUMENTS

| 2,384,807 | A | * | 9/1945 | Bickel ............................. 101/47 |
| 2,509,161 | A | | 5/1950 | Meyers |
| 3,796,143 | A | | 3/1974 | Schlimme et al. |
| 4,093,036 | A | | 6/1978 | Knutson |
| 4,261,224 | A | * | 4/1981 | Sulzer .............................. 475/2 |
| 6,023,989 | A | | 2/2000 | Imase et al. |
| 7,086,304 | B2 | | 8/2006 | Ballard |
| 7,828,094 | B2 | * | 11/2010 | Ochiai et al. ................ 180/65.28 |
| 2002/0197148 | A1 | * | 12/2002 | Belinsky ......................... 415/2.1 |
| 2003/0195076 | A1 | | 10/2003 | Ballard |
| 2004/0244522 | A1 | | 12/2004 | Ballard |

FOREIGN PATENT DOCUMENTS

| DE | 1442157 | 4/1969 |
| DE | 2162167 | 6/1973 |
| DE | 7437732 | 6/1975 |
| DE | 2654757 | 6/1978 |
| EP | 0851150 | 7/1998 |
| FR | 2205155 | 5/1974 |
| GB | 1420117 | 1/1976 |
| JP | 55-1967 | 1/1980 |
| JP | 60-91837 | 6/1985 |
| JP | 5-240327 | 9/1993 |
| JP | 11-157765 | 6/1999 |
| NL | 149584 | 10/1972 |
| WO | 01/46605 | 6/2001 |

* cited by examiner

*Primary Examiner* — Mark Paschall
(74) *Attorney, Agent, or Firm* — Greenblum & Bernstein, P.L.C.

(57) ABSTRACT

A travel drive for a traversable or rotatable device. The drive includes at least one pin wheel engaging teeth of a gear ring. This abstract is not intended to define the invention disclosed in the specification, nor intended to limit the scope of the invention in any way.

14 Claims, 1 Drawing Sheet

TRAVEL DRIVE

CROSS-REFERENCE TO RELATED APPLICATIONS

The present application is a U.S. National Stage of International Patent Application No. PCT/CH2005/000374 filed Jul. 4, 2005 which published as WO 2006/002568 on Jan. 12, 2006, and claims priority of German Patent Application No. DE 10 2004 032 442.5 filed Jul. 5, 2004.

BACKGROUND OF THE INVENTION

1. Field of the Invention

The invention relates to a travel drive, for example one that can used in systems for germinating and curing malt in malt factory systems.

2. Discussion of Background Information

Cereal grains or malts are germinated and cured on large germinating furnaces or kilns that mostly have a circular design. Several germinating furnaces are often situated one on top of the other. Moving devices for handing the germinating material are arranged over each furnace floor.

In a device for germinating and curing according to DE-OS 2162167, a material exchanging screw carrier is designed as a box beam with four wheels mounted at its ends, of which two are arranged over each other, and two next to each other. The wheels run between rails, which in turn are secured to consoles on the lateral walls and the covers of the upper furnace areas. DE-U-7437732 additionally shows a cleaning device for ventilation rooms in germinating boxes, in which each end of the carrier has two pairs of wheels situated one over the other. Each wheel pair has a gap between the wheels. The gap is filled by a rail of the wall console, so that the carrier can be traversed in this guide transverse to its longitudinal axis.

The kiln according to DE-OS 2654757 incorporates a pivotable tilting furnace in which the running rails in the swiveling area of the tilting furnace can be removed to prevent a collision between the furnace to be tilted and the running rails.

A germinating box loading and unloading device according to DE-OS 1442157 contains an open-ended or continuous plate conveyor for loading and unloading that is slidably mounted on rails.

SUMMARY OF THE INVENTION

An object of the invention is to develop a travel drive that is suitable for longitudinally traversable and rotatable equipment, such as germinating furnaces.

The travel drive has a pin wheel/gear ring arrangement containing only a small number of areas subject to wear (pins), which can also be easily replaced.

The running wheel with the gear ring is designed as a stationary drive unit on a console. A pin wheel runs on the gear ring like a pinion. The gearing is adjusted.

The corresponding material pairing defines the pin wheel as a wearing part. The latter was additionally designed in such a way as to enable easy replacement.

Given a stationary design of the transmission and pin wheel, e.g., a rotary furnace, this allows the rotary furnace to rotate.

The operating safety is enhanced at a comparatively low outlay, and assembly or disassembly is simplified.

The invention also provides for a travel drive for a traversable or rotatable device, wherein the drive comprises at least one pin wheel engaging teeth of a gear ring.

The pin wheel may be rotatable and motor driven. The gear ring may be stationarily arranged in a running wheel. The pin wheel may be coupled to a drive. The gear ring may comprise two parallel arranged gear rings. The pin wheel may comprise wearing parts. The gear ring may function as a bridge floor and as a drive system.

The invention also provides for a drive system comprising at least one pin wheel engaging teeth of a gear member and a motor driving the pin wheel.

The gear member may rotate about a vertical axis. The motor may be arranged on a cleaning or processing unit of a malt factory. The pin wheel may rotate and the motor may move transversely. The gear member may be coupled to a support arranged on a wall.

The invention also provides for a drive system for a malt factory, wherein the drive system comprises at least one pin wheel engaging teeth of a gear member and a motor driving the pin wheel and being structured and arranged to move transversely.

The gear member may rotate about a vertical axis. The motor may be arranged on a cleaning or processing unit of the malt factory. The pin wheel may rotate and the motor may move transversely. The gear member may be coupled to a support arranged on a vertical wall. The gear member may be coupled to a support arranged on a furnace wall.

BRIEF DESCRIPTION OF THE DRAWINGS

The invention will be described in greater detail below in an exemplary embodiment using a drawing. The drawing shows.

DETAILED DESCRIPTION OF THE INVENTION

Figure 1:
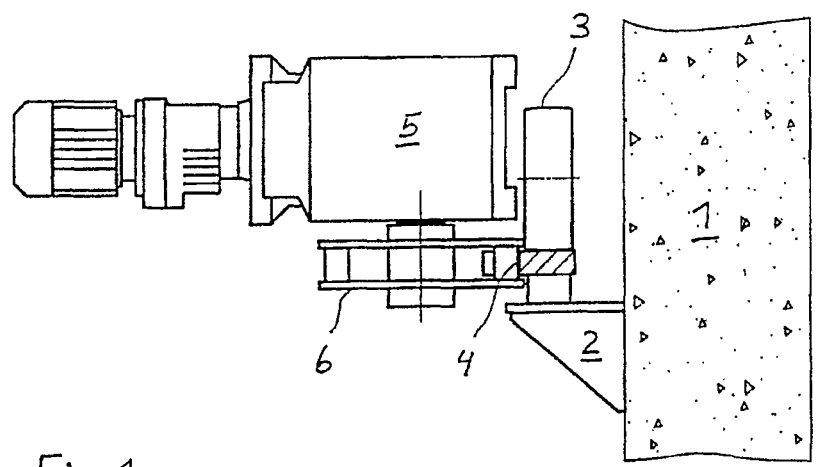
FIG. 1 shows a travel drive with pin wheel-toothed rack arrangement (front view)
Figure 2:
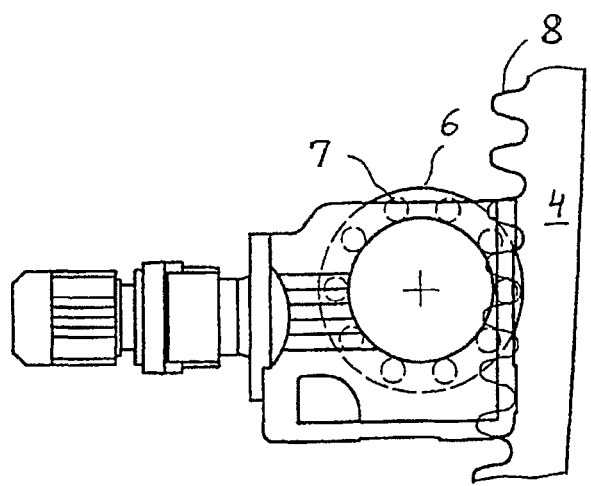
FIG. 2 shows a top view of FIG. 1.

Situated on a lateral wall 1 of a stationary furnace in a malt factory system is a console 2, which accommodates a running rail with a running wheel 3 and a gear ring 4.

Visible on the depicted device (e.g., a cleaning or processing unit) is a motor 5 with a pin wheel 6, wherein the pin wheel 6 has pins 7 spaced apart uniformly around the periphery. the pins 7 engage the teeth 8 of the gear ring 4, and a rotational motion of the pin wheel allows the traversable device 6 to travel.

This embodiment is an example, and the invention is not limited to the latter. For example, the gear ring 4 could be mounted on track rollers, arranged in a rotatable device, and the driven pin wheel 6 is immovably secured to the lateral wall 1 with a motor console.

By contrast, a longitudinal configuration would require that a console 2 be arranged on parallel lateral walls 1, and such a unit would be provided with at least one, but preferably two independent drive units (i.e., motor 5, pin wheel 6).

The invention claimed is:

1. A travel drive for a traversable or rotatable device, the drive comprising:

at least one pin wheel engaging teeth of a gear ring, the pin wheel being rotatable and motor driven;

a material pairing of the pin wheel and gear ring is such that the pin wheel comprises wearing parts in relation to a gear ring, such that the pin wheel wears out faster than the gear ring; and the gear ring functioning as a track and as a drive system.

2. The travel drive of claim 1, wherein the gear ring is stationarily arranged in a running wheel.

3. The travel drive of claim 1, wherein the pin wheel is coupled to a drive.

4. The travel drive of claim 1, wherein the gear ring comprises two parallel arranged gear rings.

5. A drive system comprising:

at least one pin wheel engaging teeth of a gear member; and a motor that drives the pin wheel to rotate so as to move the gear member, wherein respective materials for the at least one pin wheel and the gear member are selected so that the pin wheel is structured as a wearing part in relation to the gear member, such that the pin wheel wears out faster than the gear ring.

6. The drive system of claim 5, wherein the gear member rotates about a vertical axis.

7. The drive system of claim 5, wherein the motor is arranged on a cleaning or processing unit of a malt factory.

8. The drive system of claim 5, wherein the gear member is coupled to a support arranged on a wall.

9. A drive system for a malt factory, the drive system comprising:

at least one pin wheel engaging teeth of a gear member; and a motor driving the pin wheel to rotate and the motor being structured and arranged to move the gear member, wherein respective materials for the at least one pin wheel and the gear member are selected so that the pin wheel is structured as a wearing part in relation to the gear member, such that the pin wheel wears out faster than the gear ring.

10. The drive system of claim 9, wherein the gear member rotates about a vertical axis.

11. The drive system of claim 9, wherein the motor is arranged on a cleaning or processing unit of the malt factory.

12. The drive system of claim 9, wherein the gear member is coupled to a support arranged on a vertical wall.

13. The drive system of claim 9, wherein the gear member is coupled to a support arranged on a furnace wall.

14. The drive system of claim 9, wherein the pin wheel rotates about a vertical axis and the motor moves transversely.

* * * * *